US012618273B1

(12) United States Patent
Mohs et al.

(10) Patent No.: US 12,618,273 B1
(45) Date of Patent: May 5, 2026

(54) PROTECTED WINDOW OPENING CONTROL DEVICE ASSEMBLIES AND METHODS

(71) Applicant: Andersen Corporation, Bayport, MN (US)

(72) Inventors: Ryan Mohs, Woodbury, MN (US); Gary Hoffbeck, Somerset, WI (US); David Runk, Hudson, WI (US)

(73) Assignee: Andersen Corporation, Bayport, MN (US)

(*) Notice: Subject to any disclaimer, the term of this patent is extended or adjusted under 35 U.S.C. 154(b) by 0 days.

(21) Appl. No.: 18/908,944

(22) Filed: Oct. 8, 2024

Related U.S. Application Data

(60) Provisional application No. 63/543,165, filed on Oct. 9, 2023.

(51) Int. Cl.
*E05C 17/16* (2006.01)
*E05C 17/60* (2006.01)

(52) U.S. Cl.
CPC ............ *E05C 17/166* (2013.01); *E05C 17/60* (2013.01)

(58) Field of Classification Search
CPC .. E05C 17/60; E05C 2007/007; E05C 19/022; E05C 19/06; E05B 65/0852; Y10T 292/65
See application file for complete search history.

(56) References Cited

U.S. PATENT DOCUMENTS

| | | | | |
|---|---|---|---|---|
| 5,203,596 | A * | 4/1993 | Stevens | E05B 65/0841 292/204 |
| 8,776,440 | B2 * | 7/2014 | Sopkowiak | E05B 65/0835 292/DIG. 47 |
| 9,816,300 | B2 * | 11/2017 | Derham | E05C 7/005 |
| 10,920,469 | B2 * | 2/2021 | Liang | E05C 3/14 |
| 11,168,495 | B1 * | 11/2021 | Liang | E05B 63/20 |
| 12,359,487 | B1 * | 7/2025 | Baynton | E05C 19/022 |
| 2012/0124911 | A1 * | 5/2012 | Hagemeyer | E05C 17/60 292/228 |
| 2012/0167475 | A1 * | 7/2012 | Sopkowiak | E05C 17/60 49/506 |
| 2015/0275556 | A1 * | 10/2015 | Curtis | E05B 65/0835 49/506 |
| 2016/0319577 | A1 * | 11/2016 | Liang | E05C 3/14 |
| 2018/0119463 | A1 * | 5/2018 | Liang | E05B 63/18 |
| 2018/0209186 | A1 * | 7/2018 | Van Essen | E05C 17/02 |
| 2021/0025197 | A1 * | 1/2021 | Hamand | E05C 3/048 |

* cited by examiner

*Primary Examiner* — Justin B Rephann
(74) *Attorney, Agent, or Firm* — Mueting Raasch Group

(57) ABSTRACT

Window opening control device assemblies including a sash restrictor and a restrictor cover, fenestration units including the window opening control device assemblies, and related methods. A restrictor cover is provided to substantially enclose the sash restrictor such that the sash restrictor is protected during shipping and installation of fenestration units using the sash restrictors.

13 Claims, 5 Drawing Sheets

PROTECTED WINDOW OPENING CONTROL DEVICE ASSEMBLIES AND METHODS

RELATED APPLICATION

The present application claims the benefit under 35 U.S.C. § 119 (e) of U.S. Provisional Patent Application 63/543,165 filed on Oct. 9, 2023, which is hereby incorporated by reference in its entirety.

Window opening control device assemblies including a sash restrictor and a restrictor cover, fenestration units including the window opening control device assemblies, and related methods are described herein.

Windows having one or more movable sashes in a frame are commonly referred to as single hung windows (in which a movable sash and a fixed sash are contained in a frame and the movable sash moves vertically within the frame), double hung windows (in which two movable sashes are arranged vertically relative to each other and both sashes can move vertically within the frame) and sliding windows (in which one or more movable sashes move horizontally within a frame).

Because at least one sash can move within the frames of these windows, it may be desirable to limit the degree or amount of unrestricted opening in the interest of safety. Devices commonly referred to as "window opening control devices" or "vent stops" may be provided to limit the degree or amount of unrestricted opening. Window opening control devices are often flush mounted on a sash stile, sash rail, or a window frame member.

The window opening control devices are typically positioned to allow for full range of movement of a sash when desired. When needed, however, an arm of the window opening control device protrudes from the surface in which the device is installed to limit the movement of a sash to a set travel distance based on the location of the window opening control device.

SUMMARY

Window opening control device assemblies including a sash restrictor and a restrictor cover, fenestration units including the window opening control device assemblies, and related methods are described herein.

In one or more embodiments of the window opening control device assemblies described herein, a restrictor cover is provided to substantially enclose the sash restrictor such that the sash restrictor is protected during shipping and installation of fenestration units using the sash restrictors.

Although sash restrictors can be installed on a fenestration unit at any time including during manufacturing, sash restrictors installed on fenestration units during manufacturing may be prone to malfunction due to the intrusion of dust and other construction debris (e.g. drywall dust, etc.) into the internal parts of the sash restrictors.

The restrictor covers of the window opening control device assemblies described herein substantially reduce or prevent the intrusion of dust and other debris into the internal parts of sash restrictors on which the restrictor covers are located. As a result, the sash restrictors in the window opening control device assemblies described herein can be attached to fenestration units during manufacturing. Potential advantages of attaching the sash restrictors to fenestration units during manufacturing include, but are not limited to, accurate placement of the sash restrictors, ensuring sash restrictors are in place on fenestration units, etc.

In one or more embodiments, the restrictor covers of the window opening control device assemblies described herein can be removed without disturbing attachment of the sash restrictors to the fenestration units on which they are installed. In other words, the restrictor covers can be removed while the sash restrictors remain attached to the fenestration units.

The restrictor covers in one or more embodiments of the window opening control device assemblies described herein may also assist in holding the arm of the sash restrictor in a retracted configuration so that movement of a sash within a fenestration unit frame is not restricted by the sash restrictor.

In a first aspect, one or more embodiments of a window opening control device assembly as described herein may include: a sash restrictor configured for attachment to a fenestration unit, wherein the sash restrictor comprises a mounting tab extending from a restrictor body and an arm attached to the restrictor body, wherein the arm is movable between an extended configuration and a retracted configuration, wherein a terminal end of the arm moves into alignment with the restrictor body and the mounting tab when moving from the extended configuration to the retracted configuration and wherein the terminal end of the arm moves away from alignment with the restrictor body and the mounting tab when moving from the retracted configuration to the extended configuration; and a restrictor cover comprising a front shell and a back shell attached to each other along a hinge, wherein the front shell comprises a front shell free edge located opposite the hinge and the back shell comprises a back shell free edge located opposite the hinge, wherein the front shell and the back shell are configured to rotate relative to each other about the hinge, wherein the front shell and the back shell define a cavity between the front shell and the back shell when the restrictor cover is in a closed configuration in which a front shell free edge and a back shell free edge are located adjacent each other, and wherein the restrictor body and arm are contained in the cavity when the restrictor cover is in the closed configuration.

In one or more embodiments of the window opening control device assemblies described herein, the sash restrictor comprises an adhesive tape strip attached to the restrictor body and the arm, the adhesive tape strip configured to retain the arm in the retracted configuration before the retractor body is placed in the cavity.

In one or more embodiments of the window opening control device assemblies described herein, the cavity is located between the hinge and the front shell free edge when the restrictor cover is in the closed configuration.

In one or more embodiments of the window opening control device assemblies described herein, the front shell and the back shell comprise one or more interfering closure tab assemblies, wherein the one or more interfering closure tab assemblies are configured to retain the restrictor cover in the closed configuration. In one or more embodiments, the one or more interfering closure tab assemblies comprise a pair of interfering closure tab assemblies, and wherein the cavity is located between the pair of interfering closure tab assemblies when moving between the pair of interfering closure tab assemblies in a direction aligned with a hinge axis defined by the hinge.

In one or more embodiments of the window opening control device assemblies described herein, the mounting tab extends away from the cavity such that, when the restrictor body is contained in the cavity and the restrictor cover is in the closed configuration, the mounting tab extends from the restrictor cover such that the mounting tab is configured to mount directly to a frame member of a fenestration unit while the restrictor body is contained in the cavity and the restrictor cover is in the closed configuration.

In one or more embodiments of the window opening control device assemblies described herein, a rib extends from one of the front shell and the back shell into a channel formed in the other of the front shell and the back shell when the restrictor cover is in the closed configuration, wherein a first portion of the rib is located between the cavity and the hinge. In one or more embodiments, a second portion of the rib is located between the cavity and a first edge of the one of the front shell and the back shell, wherein the first edge extends between the hinge and the free edge of the one of the front shell and the back shell on a side of the restrictor cover opposite from the first edge such that second portion of the rib is located between the first edge and the cavity when moving in a direction aligned with the hinge. In one or more embodiments, a third portion of the rib is located between the cavity and a second edge of the one of the front shell and the back shell, wherein the second edge extends between the hinge and the free edge of the one of the front shell and the back shell on a side of the restrictor cover opposite from the first edge such that third portion of the rib is located between the second edge and the cavity when moving in a direction aligned with the hinge. In one or more embodiments, the first portion of the rib connects the second portion of the rib to the third portion of the rib.

In one or more embodiments of the window opening control device assemblies described herein, the restrictor cover comprises a label well located between the cavity and the hinge, the label comprising a depression formed in at least one of the front shell and the back shell.

In a second aspect, one or more embodiments of a fenestration unit includes a window opening control device assembly described herein attached to the fenestration unit, wherein the mounting tab of the sash restrictor is directly attached to a frame member of the fenestration unit, and wherein the restrictor body is in the cavity and the restrictor cover is in the closed configuration.

In one or more embodiments of the fenestration units including a window opening control device assembly attached thereto as described herein, the sash restrictor comprises an adhesive tape strip attached to the restrictor body and the arm, the adhesive tape strip configured to retain the arm in the retracted configuration after restrictor cover is removed from the sash retractor.

In one or more embodiments of the fenestration units including a window opening control device assembly attached thereto as described herein, the front shell and the back shell comprise one or more interfering closure tab assemblies, wherein the one or more interfering closure tab assemblies are configured to retain the restrictor cover in the closed configuration. In one or more embodiments, the one or more interfering closure tab assemblies comprise a pair of interfering closure tab assemblies, and wherein the cavity is located between the pair of interfering closure tab assemblies when moving between the pair of interfering closure tab assemblies in a direction aligned with a hinge axis defined by the hinge.

In one or more embodiments of the fenestration units including a window opening control device assembly attached thereto as described herein, the mounting tab extends from the restrictor cover.

In one or more embodiments of the fenestration units including a window opening control device assembly attached thereto as described herein, a rib extends from one of the front shell and the back shell into a channel formed in the other of the front shell and the back shell when the restrictor cover is in the closed configuration, wherein a first portion of the rib is located between the cavity and the hinge. In one or more embodiments, wherein a second portion of the rib is located between the cavity and a first edge of the one of the front shell and the back shell, wherein the first edge extends between the hinge and the free edge of the one of the front shell and the back shell on a side of the restrictor cover opposite from the first edge such that second portion of the rib is located between the first edge and the cavity when moving in a direction aligned with the hinge. In one or more embodiments, a third portion of the rib is located between the cavity and a second edge of the one of the front shell and the back shell, wherein the second edge extends between the hinge and the free edge of the one of the front shell and the back shell on a side of the restrictor cover opposite from the first edge such that third portion of the rib is located between the second edge and the cavity when moving in a direction aligned with the hinge. In one or more embodiments, the first portion of the rib connects the second portion of the rib to the third portion of the rib.

In one or more embodiments of the fenestration units including a window opening control device assembly attached thereto as described herein, the restrictor cover comprises a label well located between the cavity and the hinge, the label well comprising a depression formed in at least one of the front shell and the back shell. In a third aspect, one or more embodiments of a method of installing a sash restrictor on a fenestration unit as described herein includes: providing a window opening control device assembly as described herein with the restrictor body in the cavity and the restrictor cover in the closed configuration; and attaching the mounting tab of the sash restrictor to a frame member of a fenestration unit while the restrictor body is contained within the cavity of the restrictor cover.

One or more embodiments of the methods of installing a sash restrictor as described herein includes removing the restrictor cover from the sash restrictor after attaching the mounting tab to the frame member, wherein the mounting tab remains attached to the frame member while removing the restrictor cover. In one or more embodiments, the sash restrictor comprises an adhesive tape strip attached to the restrictor body and the arm, and wherein the method comprises removing the adhesive tape strip after removing the restrictor cover from the sash restrictor.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when fenestration units are properly installed in a building opening.

Where used herein, the terms "exterior" and "interior" are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the window opening control device assemblies, fenestration units including window opening control device assemblies, and related methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
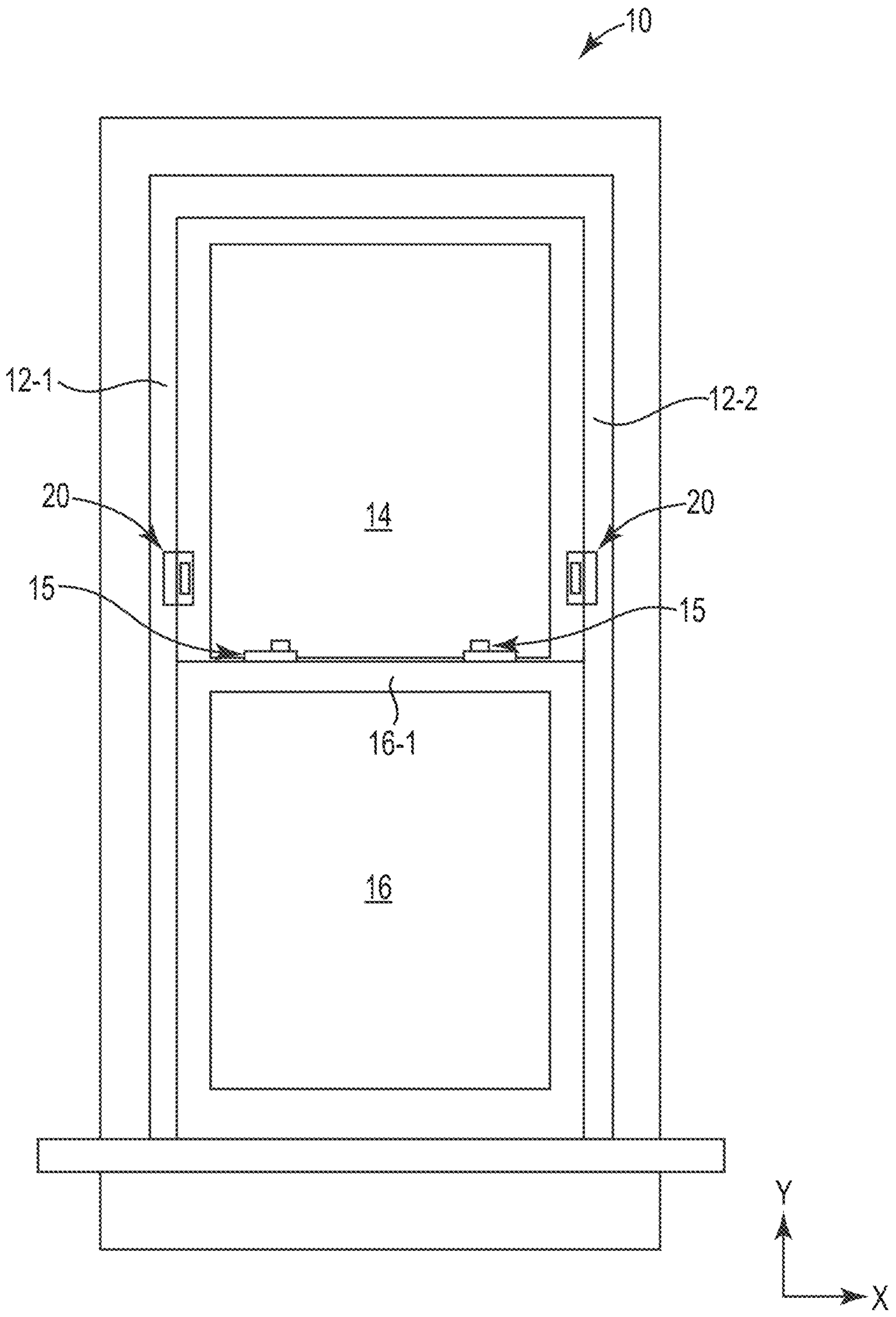
FIG. 1 depicts one illustrative embodiment of a fenestration unit in the form of a single or double hung window including a pair of window opening control device assemblies as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The illustrative embodiment of fenestration unit 10 depicted in FIG. 1 is in the form of a single or double hung window including a fenestration unit frame 12 along with sashes 14 and 16. In the depicted embodiment of fenestration unit 10, the lower sash 16 carries a pair of fenestration lock assemblies 15 on a check rail 16-1 to lock the sashes 14 and 16 in their closed positions. A pair of sash restrictors 20 of one or more embodiments of the window opening control device assemblies described herein are mounted on frame members 12-1 and 12-2 of the fenestration unit 10, with the sash restrictors 20 being positioned to restrict movement of the lower sash 16 upwards past the sash restrictors 20.

Although the sash restrictors 20 depicted in connection with fenestration unit 10 are located on the frame members 12-1 and 12-2, alternative embodiments of fenestration units including window opening control device assemblies as described herein may include only one sash restrictor 20. Also, although depicted in connection with a double/single hung window, the sash restrictors of the window opening control device assemblies described herein may also be used in any other type of fenestration unit including a sash or panel that slides or translates in any desired direction to provide an opening in a fenestration unit, e.g., fenestration units commonly referred to as sliders, gliders, etc.

FIG. 1 includes the X and Y axes of a Cartesian coordinate system while the remainder of the figures also include axes corresponding to the same Cartesian coordinate system to assist the reader in understanding the present invention. Unless expressly stated herein, the axes of the Cartesian coordinate system may take any orientation as needed by a user of the apparatus and methods described herein. In other words, the Y axis may not necessarily be oriented vertically with respect to the direction of gravity.

Figure 2:
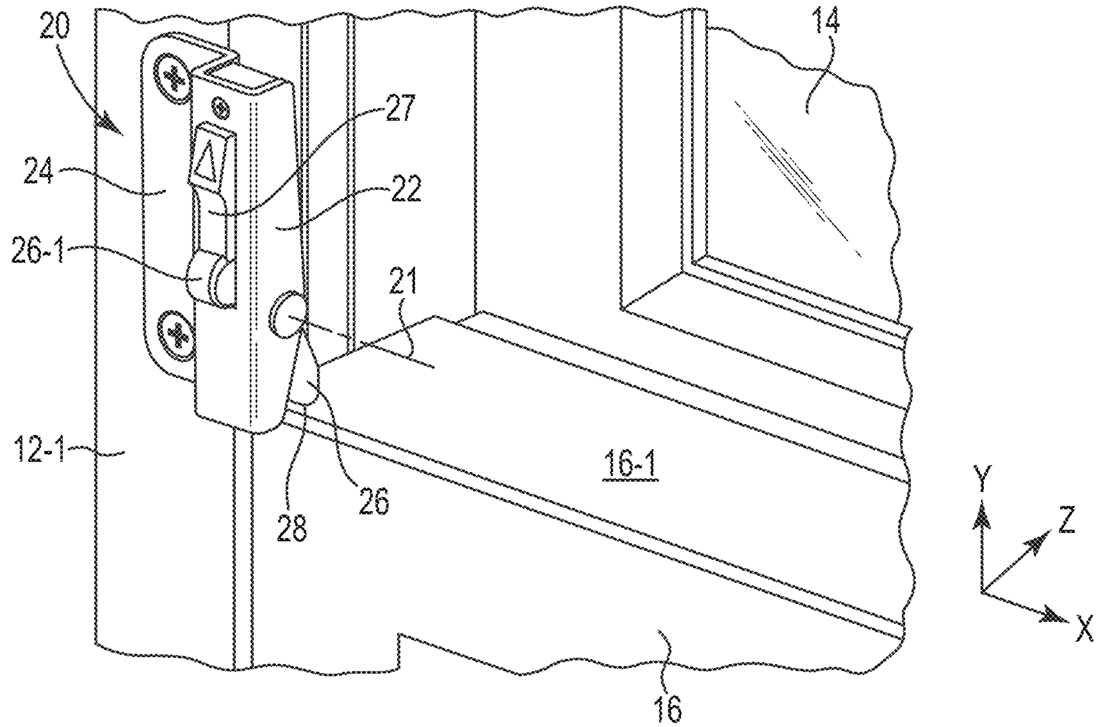
FIG. 2 is a perspective view of one illustrative embodiment of a sash restrictor that may be used in one or more embodiments of the window opening control device assemblies described herein mounted on a fenestration unit.

FIG. 2 is an enlarged perspective view of the illustrative embodiment of window opening control device assembly 20 located on a frame member 12-1 with the sash 16 moved upwards such that check rail 16-1 is located adjacent the sash restrictor 20.

The sash restrictor 20 depicted in FIG. 2 includes a restrictor body 22 and a mounting tab 24 extending from the restrictor body. The mounting tab 24 is attached to frame member 12-1 of the fenestration unit (see, e.g., FIG. 1). The sash restrictor includes an arm 26 attached to the restrictor body, the arm 26 movable between an extended configuration in which the arm protrudes from the restrictor body 22 such that a terminal end 28 of arm 26 restricts or prevents movement of sash 16 as depicted in FIG. 2. Arm 26 of sash restrictor 20 also includes a retracted configuration in which the arm 26 is retracted into alignment with the restrictor body 22 and mounting tab 24 such that the sash 16 can move past the sash restrictor 20. In the embodiment as depicted in FIG. 2, such movement of sash 16 would be in the Y axis direction. Also in the depicted illustrative embodiment, arm 26 rotates about arm axis 21 when moving between its extended and retracted configurations.

The depicted illustrative embodiment of sash restrictor 20 includes an actuator 27 that can be moved upward to release arm 26 so that arm 26 can be rotated about arm axis 21 from its extended configuration (as seen in, e.g., FIG. 2) to its retracted configuration (as seen in, e.g., FIG. 4) when movement of sash 16 past the sash restrictor 20 is desired. Rotation of the arm 26 about arm axis 21 from its extended configuration to its retracted configuration is, in the depicted illustrative embodiment, effected by pushing the upper end 26-1 of the arm 26 towards sash 14 (in the direction of the Z axis). Further details of the construction of and examples of sash restrictors such as those depicted in FIGS. 1 and 2 may be described in, for example, U.S. Pat. No. 9,816,300 (Derham).

Figure 3:
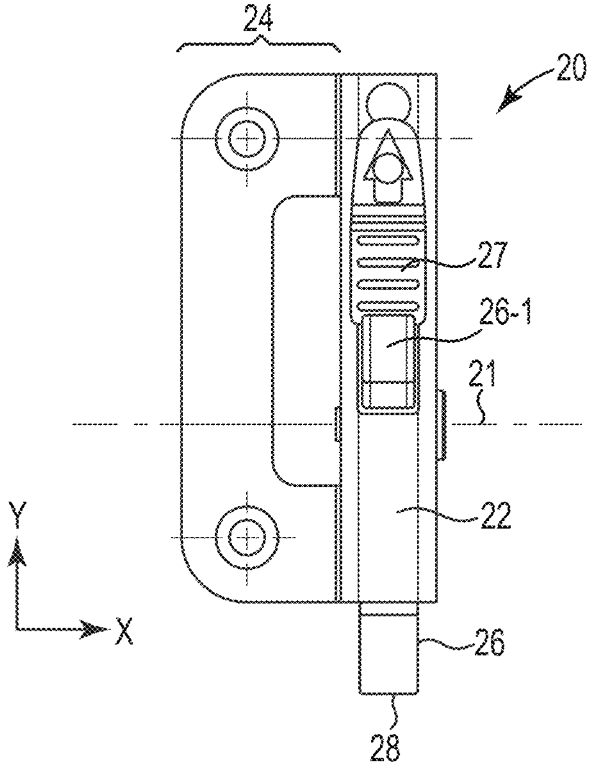
FIG. 3 is a front view of one illustrative embodiment of a sash restrictor that may be used in one or more embodiments of the window opening control device assemblies described herein.

FIG. 3 is a front view of one illustrative embodiment of the sash restrictor 20 with the arm 26 located in its retracted configuration that may be used in one or more embodiments of the window opening control device assemblies described herein. As described herein, the arm 26 is movable between an extended configuration as depicted in FIG. 2 and a retracted configuration as depicted in FIG. 3.

In the depicted illustrative embodiment, a terminal end 28 of the arm 26 moves into alignment with the restrictor body 22 and the mounting tab 24 when moving from the extended configuration to the retracted configuration and the terminal end 28 of the arm 26 moves away from alignment with the restrictor body 22 and the mounting tab 24 when moving from the retracted configuration to the extended configuration such that the terminal end 28 of the arm 26 can contact a sash to prevent passage.

Figure 4:
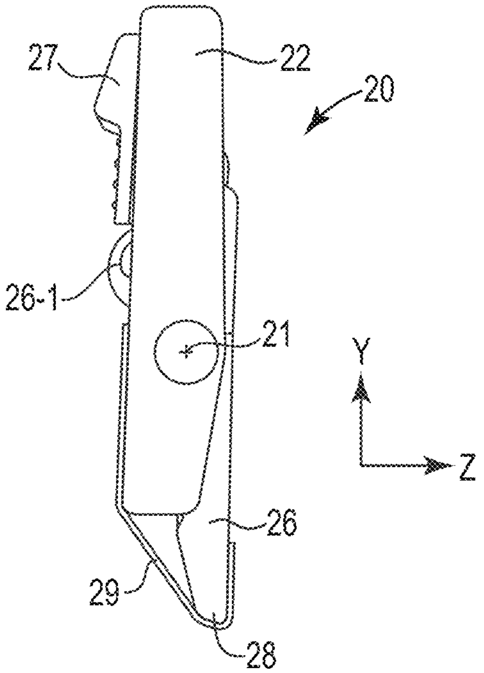
FIG. 4 is a side view of the sash restrictor depicted in FIG. 3 with an adhesive tape strip attached to retain the arm of the sash restrictor in the retracted configuration.

FIG. 4 is a side view of the sash restrictor 20 depicted in FIG. 3 with an adhesive tape strip 29 attached to retain the arm 26 of the sash restrictor 20 in the retracted configuration. The adhesive tape strip 29 extends from the backside of arm 26 (i.e., the side of arm 26 facing to the right in FIG. 4) around the terminal end 28 and up to the front side of the restrictor body 22 (i.e. the side of the restrictor body 22 facing to the left in FIG. 4). In many embodiments, sash restrictors are configured to be biased in the extended configuration in which they can restrict or prevent movement of a sash. With respect to sash restrictor 20, arm 26 is biased to the extended configuration as seen in FIG. 2 and the adhesive tape strip 29 retains the arm 26 of the sash restrictor 20 in the retracted configuration until removed.

Figure 5:
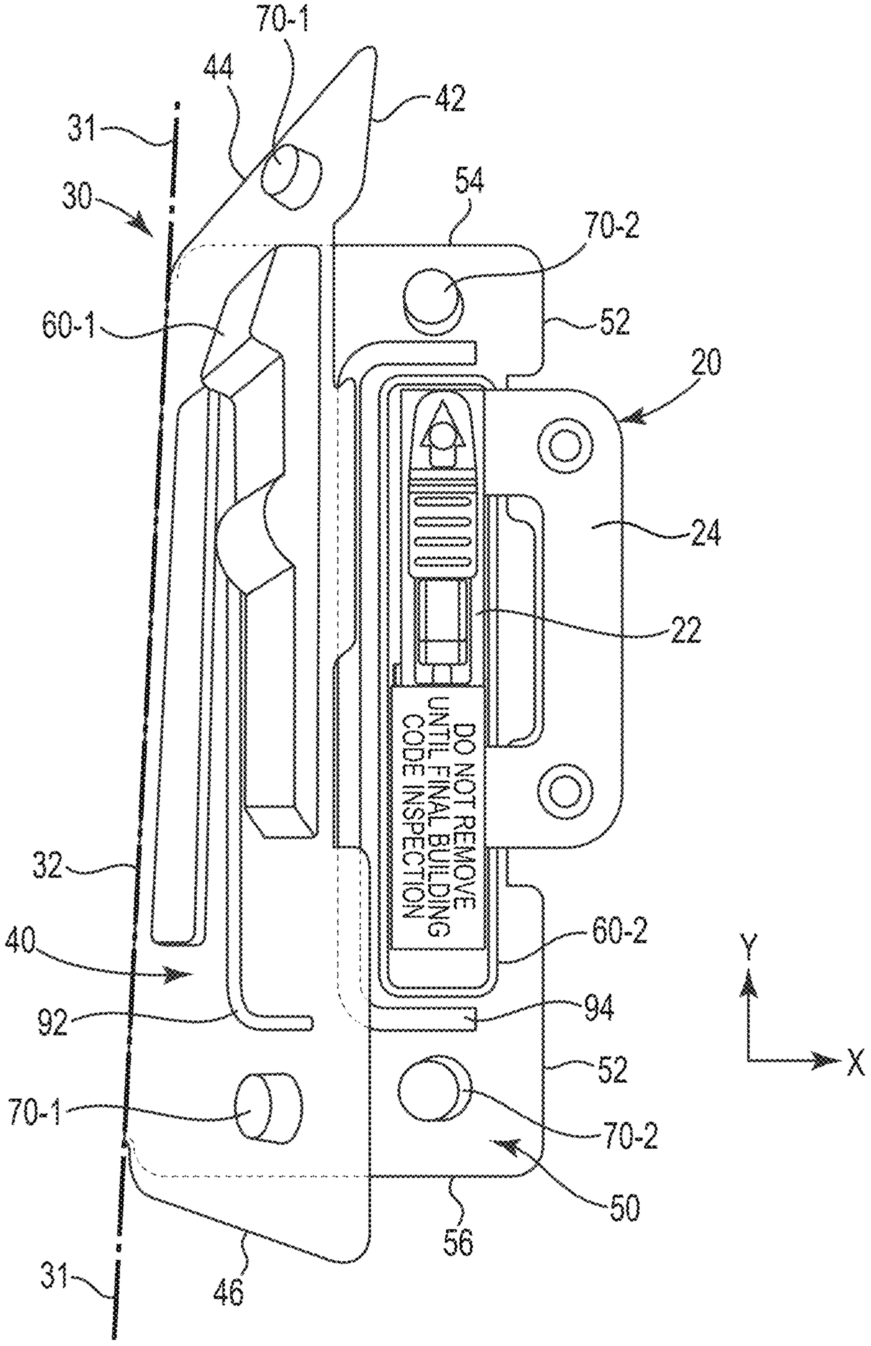
FIG. 5 is a perspective view one illustrative embodiment of the window opening control device assemblies described herein including the sash restrictor of FIGS. 3-4 positioned in one illustrative embodiment of a restrictor cover, with the restrictor cover in an opened configuration.
Figure 6:
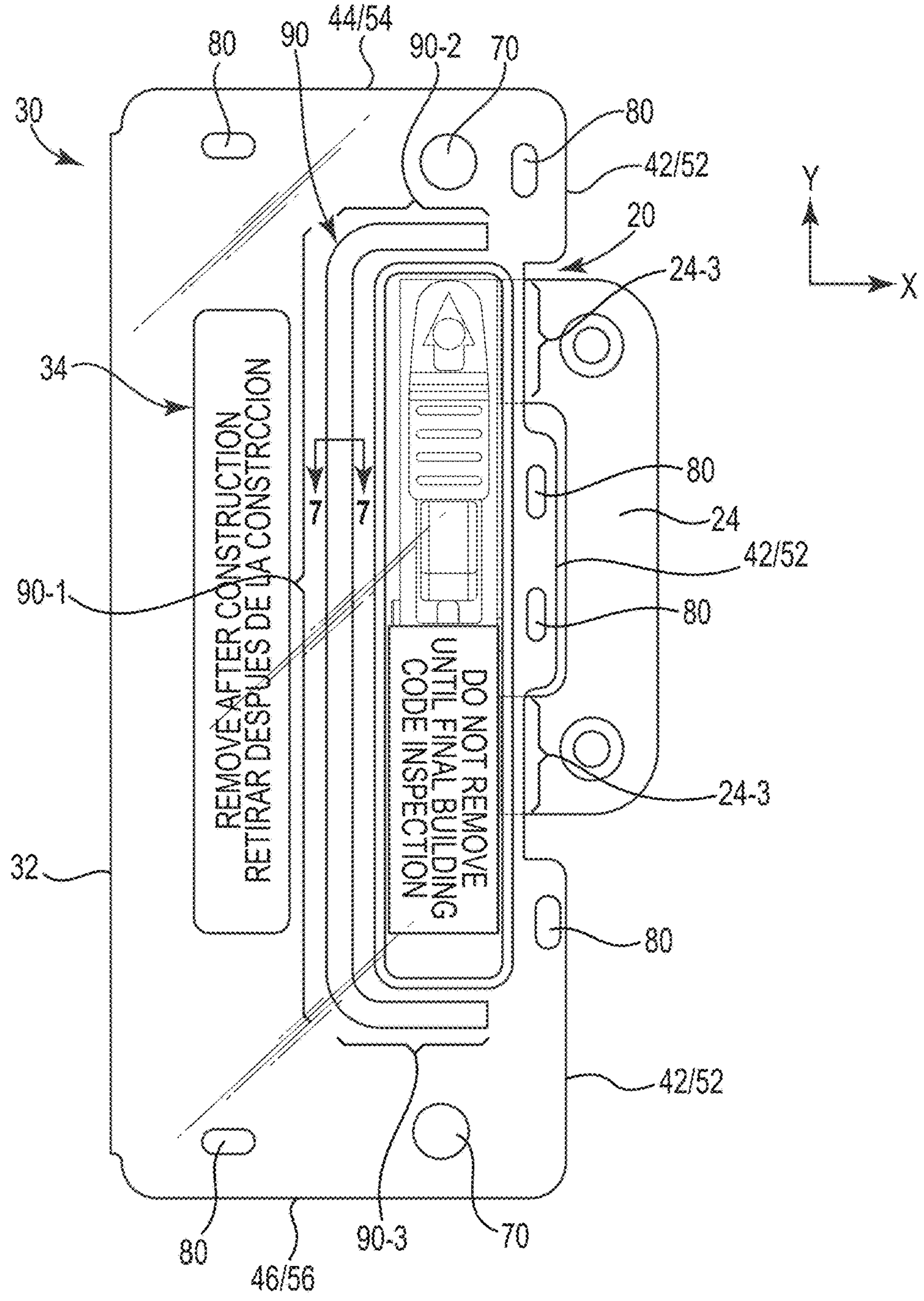
FIG. 6 is a front view of the window opening control device assembly of FIG. 5 after closure of the restrictor cover.
Figure 8:
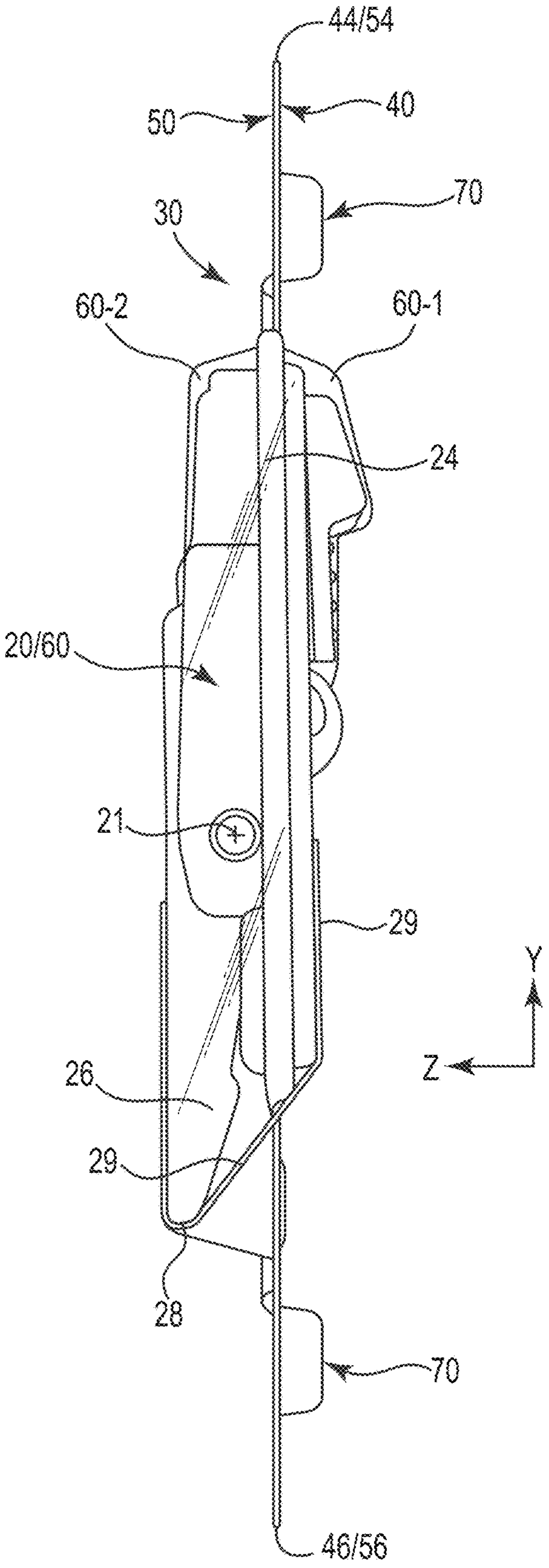
FIG. 8 is a side view of the window opening control device assembly of FIG. 6.

The window opening control device assemblies described herein include a sash restrictor and a restrictor cover. One illustrative embodiment of a restrictor cover 30 used in connection with the illustrative embodiment of sash restrictor 20 is depicted in FIGS. 5, 6, and 8. FIG. 5 is a perspective view one illustrative embodiment of the window opening control device assemblies described herein including the sash restrictor 20 of FIGS. 2-4 positioned in one illustrative embodiment of a restrictor cover 30, with the restrictor cover 30 depicted in an opened configuration in FIG. 5. FIG. 6 is a front view of the window opening control device assembly of FIG. 5 after closure of the restrictor cover 30 such that the restrictor cover 30 is in the closed configuration and FIG. 8 is a side view of the window opening control device assembly of FIG. 6.

The restrictor cover 30 includes a front shell 40 and a back shell 50 attached to each other along a hinge 32, with the hinge 32 defining a hinge axis 31. The front shell 40 includes a front shell free edge 42 located opposite the hinge 32 and the back shell 50 includes a back shell free edge 52 located opposite the hinge 32. The front shell 40 and back shell 50 are configured to rotate relative to each other about the hinge 32 (and hinge axis 31) when moving from an open configuration as seen in FIG. 5 to a closed configuration as seen in FIGS. 6 and 8.

When in the closed configuration the front shell 40 and back shell 50, the front shell free edge 42 and back shell free edge 52 are located adjacent each other and the front shell 40 and back shell 50 define a cavity between the shells 40 and 50, with the restrictor body and arm being contained within the cavity. In the depicted illustrative embodiment, the cavity formed between the shells 40 and 50 is formed by a front well 60-1 in front shell 40 and a back well 60-2 in the back shell 50. When in the closed configuration as depicted in FIGS. 6 and 8 the front well 60-1 and back well 60-2 combine to form the cavity 60 with the sash restrictor 20 located therein.

As a result, the cavity 60 may be described as being located between the front shell 40 and back shell 50. In addition, the cavity 60 may also be described as being located between the hinge 32 and the front shell free edge 42 (and/or the back shell free edge 52) when the restrictor cover 30 is in its closed configuration.

When the restrictor body 22 is contained in the cavity 60 and the restrictor cover 30 is in the closed configuration the mounting tab 24 of the sash restrictor extends away from the cavity 60 as well as extending out of the restrictor cover 30. As a result, the mounting tab 24 can be mounted directly to a frame member of a fenestration unit (see, e.g., frame member 12-1 in FIGS. 1 and 2) while the restrictor body 22 is contained in the cavity 60 and the restrictor cover 30 is in its closed configuration. As a result, the components within the restrictor body 22 are protected from dust and debris by the restrictor cover 30 even though the sash restrictor 20 is attached to a fenestration unit.

The depicted illustrative embodiment of restrictor cover 30 includes interfering closure tab assemblies 70 that are configured to retain the restrictor cover in the closed configuration. Although the depicted embodiment of restrictor cover 30 includes two interfering closure tab assemblies 70, in one or more alternative embodiments, a single interfering closure tab assembly or three or more interfering closure tab assemblies may be provided to retain the restrictor cover in its closed configuration.

The pair of interfering closure tab assembly 70 may be described as located on opposite ends of the cavity 60 containing the restrictor body 22 of sash restrictor 20. As a result, the cavity 60 may be described as being located between the pair of interfering closure tab assembly 70 when moving between the pair of interfering closure tab assembly 70 in a direction aligned with the hinge axis 31.

The depicted embodiments of interfering closure tab assembly 70 are in the form of a cavity 70-1 and protrusion 70-2 (see, e.g., FIG. 5) with the protrusion 70-2 being located in the cavity 70-1 and retained therein, in one or more embodiments, through friction and/or mechanical interference. In the depicted embodiment, the cavity 70-1 of the interfering closure tab assembly is located in the front shell 40 and the protrusion 70-2 is located on back shell 50. It should, however, be understood that those positions could be reversed, i.e., the cavity may be located in the back shell 50 and the protrusion may be located on the front shell 40.

Although the interfering closure tab assemblies 70 may be sufficient to retain the restrictor cover 20 and its closed configuration, one or more embodiments of a window opening control device assembly as described herein may include optional connections 80 located about a perimeter of the restrictor cover 30. In the depicted embodiment, six connections 80 are positioned about the perimeter, although in one or more alternative embodiments, any number of connections or no connections at all may be provided. In one or more embodiments, the connections 80 may be in the form of thermal and/or chemical welds, adhesives, etc. attaching the front shell 40 and the back shell 50 together.

When provided, the connections 80 may assist in limiting the entry of dust or other contaminants into the space between the front shell 40 and back shell 50 as well as into the cavity 60 in which the restrictor body 22 of sash restrictor 20 is located by assisting in maintaining proximity between the front shell 40 and the back shell 50.

In one or more alternative embodiments of window opening control device assemblies described herein, the front shell 40 and back shell 50 of a restrictor cover 30 may be maintained in the closed configuration using only connections 80 in the absence of interfering closure tab assemblies 70.

The depicted illustrative embodiment of sash restrictor 20 includes an adhesive tape strip 29 to retain the arm 26 of the sash restrictor 20 in the retracted configuration such that the sash restrictor 20 may be in its retracted configuration before being placed in the cavity 60 of the restrictor cover 30. In one or more embodiments, however, the interfering closure tab assemblies 70 and/or connections 80 may provide sufficient force to retain the restrictor cover 30 in its closed configuration while also retaining the arm 26 of the sash restrictor 20 in its retracted configuration in the absence of the adhesive tape strip 29.

As discussed herein, the restrictor body 22 of sash restrictor 20 is contained within the cavity 60 of restrictor cover 30 even when mounting tab 24 is attached to a fenestration unit. With reference to FIG. 6 in particular, the mounting tab 24 extends out of the restrictor cover 30 through openings 24-3 between the front shell 40 and back shell 50. In the depicted illustrative embodiment, the restrictor cover 30 includes connections 80 between the front shell 40 and back shell 50 between the openings 24-3 in the restrictor cover 32 assist in limiting dust or debris infiltration through openings 24-3.

When the mounting tab 24 of the sash restrictor 20 is attached to a fenestration unit frame as seen in FIG. 2 and the restrictor body 22 is located within the cavity 60 of the restrictor cover 30 as seen in, e.g., FIG. 6, the restrictor cover 30 can be removed from the sash restrictor 20 without disturbing the attachment of mounting tab 24 2 the fenestration unit. Removal of the restrictor cover 30 involves separating the interfering closure tab assemblies 70 (if present) and/or the connections 80 (if present). After separation of the interfering closure tab assembly 70 and/or connections 80, the front shell 40 and back shell 50 can be separated from each other to allow removal of the restrictor cover 30 from the restrictor body 22.

Although attachment of the front shell 42 the back shell 50 using one or both of the interfering closure tab assembly 70 and connections 80 provide significant protection against infiltration of dust and/or debris into the cavity 60 in which restrictor body 22 is located, the depicted illustrative embodiment of the window opening control device assembly includes an additional dust/debris control feature 90 that partially surrounds the cavity 60 formed by the restrictor cover 32 further improve protection against infiltration of dust and/or debris into the cavity 60.

Figure 7:
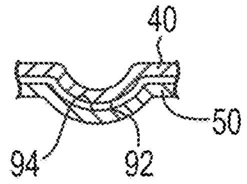
FIG. 7 is an enlarged partial cross-sectional view of a portion of the restrictor cover taken along line 7-7 in FIG. 6.

With reference to FIGS. 6 and 7, one illustrative embodiment of a dust/debris control feature 90 is in the form of a rib 92 extending from the front shell 40 and a channel 94 formed in the back shell 50, with the rib 92 extending into the channel 94 as depicted in the cross-sectional view of FIG. 7. It will be understood that the depicted embodiment of dust/debris control feature 90 could be reversed, i.e., the rib could extend from the back shell into a channel formed in the front shell.

The depicted illustrative embodiment of dust/debris control feature 90 includes a first portion 90-1 located between the cavity 60 and the hinge 32. The first portion of the dust/debris control feature 90 may limit and/or prevent dust/debris infiltration into the cavity 60 from the direction of the hinge 32.

The depicted illustrative embodiment of dust/debris control feature 90 also includes a second portion 90-2 located between the cavity 60 and an edge 44/54 of the restrictor cover 30. The edge 44/54 of restrictor cover 30 may be comprised of edges formed by the front shell 40 and back shell 50. The edge 44/54 extends from the hinge 32 to the free edges 42/52 of the front shell 40 and back shell 50.

The depicted illustrative embodiment of dust/debris control feature 90 also includes a third portion 90-3 located between the cavity 60 and an edge 46/56 of the restrictor cover 30. The edge 46/56 of restrictor cover 30 may be comprised of edges formed by the front shell 40 and back shell 50. The edge 46/56 extends from the hinge 32 to the free edges 42/52 of the front shell 40 and back shell 50.

Also in the depicted illustrative embodiment, the first portion 90-1 of the dust/debris control feature 90 (optionally) connects the second portion 90-2 of the dust/debris control feature 92 the third portion 90-3 of the dust/debris control feature.

The depicted illustrative embodiment of restrictor cover 30 also includes an optional label well 34 located between the cavity 60 and the hinge 32. The label well 34 may be in the form of a depression or well formed in at least one of the front shell 40 and back shell 50. The label well may contain a sheet or label containing instructions regarding removal of the restrictor cover 30. In particular, the label may instruct users to remove the restrictor cover 30 from the sash restrictor 20 only after construction is completed to prevent premature removal of the restrictor cover 30 which could allow dust and/or debris to impact proper operation of the sash restrictor 20.

Similarly, the optional adhesive tape strip 29 could include instructions to a user to prevent premature removal of the adhesive tape strip 29. For example, the instructions provided on the adhesive tape strip 29 may instruct a user to leave the adhesive tape strip in place until final building code inspections are completed.

Illustrative embodiments of the window opening control device assemblies, fenestration units including the window opening control device assemblies, and related methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A window opening control device assembly comprising:

a sash restrictor configured for attachment to a fenestration unit, wherein the sash restrictor comprises a mounting tab extending from a restrictor body and an arm attached to the restrictor body, wherein the arm is movable between an extended configuration and a retracted configuration, wherein a terminal end of the arm moves into alignment with the restrictor body and the mounting tab when moving from the extended configuration to the retracted configuration and wherein the terminal end of the arm moves away from alignment with the restrictor body and the mounting tab when moving from the retracted configuration to the extended configuration; and a restrictor cover comprising a front shell and a back shell attached to each other along a hinge, wherein the front shell comprises a front shell free edge located opposite the hinge and the back shell comprises a back shell free edge located opposite the hinge, wherein the front shell and the back shell are configured to rotate relative to each other about the hinge, wherein the front shell and the back shell define a cavity between the front shell and the back shell when the restrictor cover is in a closed configuration in which the front shell free edge and the back shell free edge are located adjacent each other, and wherein the restrictor body and arm are contained in the cavity when the restrictor cover is in the closed configuration.

2. The window opening control device assembly according to claim 1, wherein the sash restrictor comprises an adhesive tape strip attached to the restrictor body and the arm, the adhesive tape strip configured to retain the arm in the retracted configuration before the retractor body is placed in the cavity.

3. The window opening control device assembly according to claim 1, wherein the cavity is located between the hinge and the front shell free edge when the restrictor cover is in the closed configuration.

4. The window opening control device assembly according to claim 1, wherein the front shell and the back shell comprise one or more interfering closure tab assemblies, wherein the one or more interfering closure tab assemblies are configured to retain the restrictor cover in the closed configuration.

5. The window opening control device assembly according to claim 1, wherein the mounting tab extends away from the cavity such that, when the restrictor body is contained in the cavity and the restrictor cover is in the closed configuration, the mounting tab extends from the restrictor cover such that the mounting tab is configured to mount directly to a frame member of a fenestration unit while the restrictor body is contained in the cavity and the restrictor cover is in the closed configuration.

6. The window opening control device assembly according to claim 1, wherein the restrictor cover comprises a label well located between the cavity and the hinge, the label comprising a depression formed in at least one of the front shell and the back shell.

7. A fenestration unit comprising the window opening control device assembly according to claim 1 attached to the fenestration unit, wherein the mounting tab of the sash restrictor is directly attached to a frame member of the fenestration unit, and wherein the restrictor body is in the cavity and the restrictor cover is in the closed configuration.

8. The fenestration unit according to claim 7, wherein the sash restrictor comprises an adhesive tape strip attached to the restrictor body and the arm, the adhesive tape strip configured to retain the arm in the retracted configuration after restrictor cover is removed from the sash retractor.

9. The fenestration unit according to claim 7, wherein the front shell and the back shell comprise one or more interfering closure tab assemblies, wherein the one or more interfering closure tab assemblies are configured to retain the restrictor cover in the closed configuration.

10. The fenestration unit according to claim 7, wherein the mounting tab extends from the restrictor cover.

11. A method of installing a sash restrictor on a fenestration unit, the method comprising:

providing the window opening control device assembly according to claim 1 with the restrictor body in the cavity and the restrictor cover in the closed configuration; and attaching the mounting tab of the sash restrictor to a frame member of a fenestration unit while the restrictor body is contained within the cavity of the restrictor cover.

12. The method according to claim 11, the method comprising removing the restrictor cover from the sash restrictor after attaching the mounting tab to the frame member, wherein the mounting tab remains attached to the frame member while removing the restrictor cover.

13. The method according to claim 11, wherein the sash restrictor comprises an adhesive tape strip attached to the restrictor body and the arm, and wherein the method comprises removing the adhesive tape strip after removing the restrictor cover from the sash restrictor.

* * * * *